United States Patent [19]

Larsen

[11] Patent Number: 4,567,851

[45] Date of Patent: Feb. 4, 1986

[54] GATE ASSEMBLY

[75] Inventor: Owen M. Larsen, Tallangatta, Australia

[73] Assignee: Janet Rose Larsen, Tallangatta, Victoria, Australia; a part interest

[21] Appl. No.: 575,090

[22] Filed: Jan. 30, 1984

[30] Foreign Application Priority Data

Feb. 22, 1983 [AU] Australia .............................. PF8148

[51] Int. Cl.$^4$ ............................................... A01K 1/12
[52] U.S. Cl. ......................................... 119/27; 49/116
[58] Field of Search .................. 119/14.03, 27, 98, 99; 49/109, 116, 122

[56] References Cited

U.S. PATENT DOCUMENTS

| 889,045 | 5/1908 | Rodden et al. | 119/27 X |
| 2,786,449 | 3/1957 | Dahlerup | 119/99 |
| 2,814,271 | 11/1957 | Black | 119/14.03 X |
| 3,415,227 | 12/1968 | Welsh | 119/27 |
| 3,792,686 | 2/1974 | Needham et al. | 119/14.03 |
| 4,294,196 | 10/1981 | Larsen | 119/27 |

Primary Examiner—Robert P. Swiatek
Attorney, Agent, or Firm—Fulbright & Jaworski

[57] ABSTRACT

A gate assembly for a milking parlor including a pivotal barrier mounted on a horizontal axis allowing the barrier to swing between opened and closed positions. An additional barrier is coupled to the barrier to move in synchronism therewith in an opposite direction.

11 Claims, 2 Drawing Figures

GATE ASSEMBLY

The present invention relates to an improved gate assembly for an animal enclosure and relates particularly, although not exclusively, to a gate assembly for controlling the exit of cattle from a milking parlour.

In a typical milking parlour an elongated central working area or pit is located between two relatively elevated parallel stalls each having an entry and exit gate at either end. The exit gates are arranged obliquely to the longitudinal direction of the stalls and this together with the narrowness of the stalls forces the cattle to adopt a milking position parallel to the gate. Normally the cattle in the two stalls have opposing oblique dispositions which is known as the "herringbone" arrangement.

Milking parlours of this type have often been beset by problems associated with the control of cattle through the exit gates. Gates which swing about vertical axis cannot successfully be utilized in view of the closeness of the formation of exiting cattle. If it is desired to prevent a particular cow from exiting, the gate cannot be closed until the cow has completely passed through the gate. As the following cow is very close to the rump of the exiting cow, the time delay between exit of the cow, and the closing of the gate, is sufficient to enable the following cow to be in a position preventing closure of the gate.

To overcome this problem gates are normally mounted on an upright of the enclosure adjacent the pit for pivotal movement about a horizontal axis. As the pivotal connection of the gate is opposite that of the heads of the cattle, the gate has a substantial distance to travel before the gate can act to prevent exit of cattle.

One solution to the abovementioned problems is discussed in U.S. Pat. No. 4,294,196 and the contents of the complete specification thereof are incorporated herein. The gate assembly disclosed in that specification has met with wide acceptance by the dairying industry both in Australia and overseas. One problem has arisen with this gate assembly in that it requires a large amount of headroom for its operation. When the gate is swung to its open position the gate will move upwardly and there may be insufficient headroom in some milking parlours for a complete opening of the gate.

Accordingly it is an object of the present invention to alleviate the aforementioned problem.

With this object in view the present invention provides a gate assembly for a milking parlour or like animal enclosure, said assembly including a barrier adapted to be swung about a substantially horizontal elevated axis between an open position in which it allows exit of an animal from the parlour or enclosure and a closed position in which it prevents such exit, and an additional barrier adapted to move in synchronism with said barrier in the opposite direction to that of said barrier.

Preferably said additional barrier will abut said barrier in the closed position. The additional barrier may be an arm member coupled to said barrier to act as a false gatepost for the barrier in its closed position.

A practical embodiment of the invention will now be described with reference to the non-limitative example illustrated in the accompanying drawings, in which.

Figure 1:
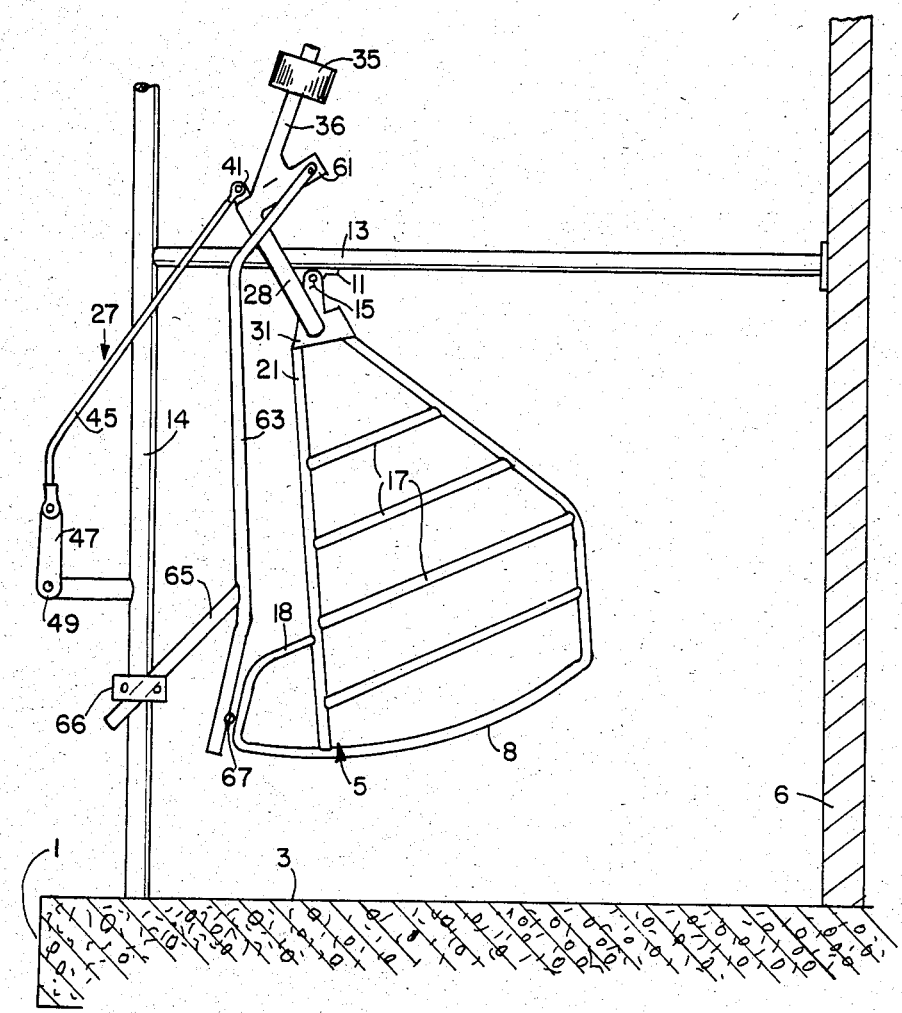
FIG. 1 is a view of a gate assembly of the present invention shown closed.

The milking parlour in which the gate assembly of the present invention is mounted as shown in the drawings of U.S. Pat. No. 4,294,196, as is the operation and locking of the barrier of the gate assembly in the open and closed positions. For a more fuller description of the milking parlour, reference should be made to 4,294,196 to avoid duplication of description.

In the drawings the milking parlour has a pit 1 for workmen, and a stall 3 for the cattle to walk on. The stall is enclosed by a gate assembly 5 at each exit end (only one being shown), and an elongated breast rail (not shown) between dairy wall 6 and gate assembly 5 and a rump rail (not shown) at the sides. The gate assembly 5 is pivotally supported by bracket member 11 attached to horizontal support member 13 secured between upright 14 and the dairy wall 6. The pivot point 15 is suitably positioned in from pit 1.

The gate assembly 5 includes a barrier 8 having a triangular or quasi-triangular framework with ribs 17 suitably arranged and spaced to prevent passage therethrough of an animal. A protruding or lateral extension 18 is located on the barrier at the bottom thereof on the side 21 adjacent pit 1. This extension 18 is positioned at about the chest height of the cattle to be enclosed.

Figure 2:
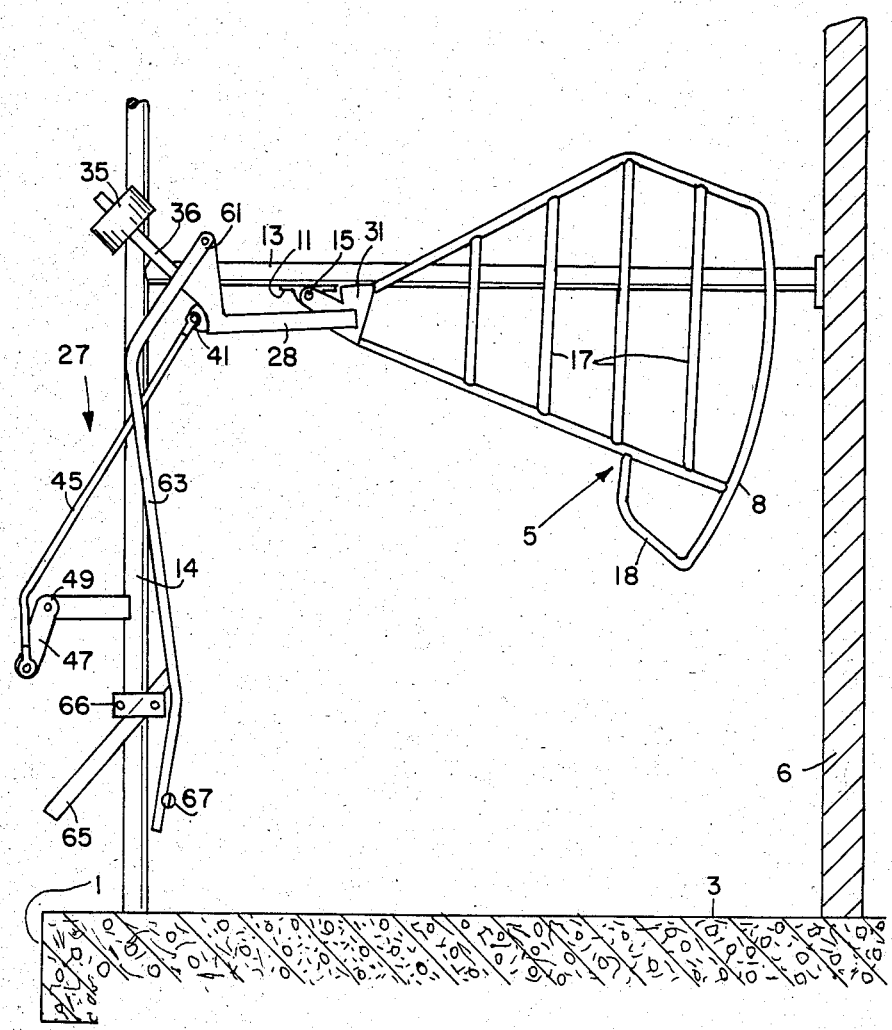
FIG. 2 is a similar view to that of FIG. 1 with the gate open.

To effect actuation of gate assembly 5 a lever arrangement 27 is provided. An extension member 28 is welded to a plate 31 of barrier 8. A counterweight 35 (the position of which may be adjustable) is mounted on arm 36. If desired, the counterweight may be additionally adjusted by including a threaded part on arm 36. The extension member 28 is pivotally attached by pivot 41 to an angled arm 45. This arm is pivotally connected to a bell crank 47 to provide an over-centre locking action for the barrier 8 in its open position (FIG. 2). Crank 47 is rotated by a shaft 49 which extends longitudinally between uprights 14. To facilitate the operation of the gate assembly from any position along the stall 3, a plurality of handles (not shown) are welded to shaft 49.

The embodiment so far described substantially corresponds with that of U.S. Pat. No. 4,294,196 and the improvements, forming the basis of this invention, to this type of gate assembly will now be described.

Extension member 28 of barrier 8 has an extension arm 61 secured thereto. Pivotally attached to extension arm 61 is an angled crank arm 63 which has its movement constrained by a locating arm 65 welded thereto. The locating arm 65 is constrained by guide 66 attached to the upright 14 for support member 13. A buffer or keeper 67 retains the gate assembly in its closed position.

In operation, the gate assembly is initially shown closed as in FIG. 1. The combination of the barrier 8 and angled crank arm 63 prevents exit of cattle. As can be seen the arm 63 acts as a false gatepost and the protruding extension 18 of barrier 8 closes against arm 63 and not the upright 14 as in 4,294,196.

The opening of barrier 8 is controlled by rotating shaft 49 by handles (not shown) which moves angled arm 45 and extension member 28, to swing the barrier upwardly to allow the cattle to exit. The barrier is locked in its uppermost position (FIG. 2) by the over-centre action of angled arm 45. The gate is easily moved at all stages because of the use of counter-weight 35. Upward movement of barrier 8 will also cause movement of arm 63 downwards and towards upright 14. This movement is a result of locating arm 65 being constrained by guide 66. In the open position shown in FIG. 2 the arm 63 will be adjacent upright 14 to allow unobstructed exit for cattle. In the open position the barrier will not rise as high as the barrier shown in U.S. Pat. No. 4,294,196 because of its reduced width requirements.

When closing of the gate is required the handle is rotated in the opposite direction to lower barrier 8. The barrier is lowered onto the last cow to be released, with the protruding extension 18 riding along her side flank. In general, the lightness of the gate, being counterbalanced as aforementioned, means that no substantial discomfort will be suffered by the last cow as a result of the action of the protruding extension, and the shape of the barrier is such that it cannot catch on the cow's hips.

As the rump of the cow passes through the gate the protruding extension will prevent the following cow from exiting. The cow will "back off" because of this extension, enabling the gate to swing shut under gravity (FIG. 1).

From the above it will be seen that the addition is an improvement over the gate assembly disclosed in 4,294,196 and maintains the advantages of that type of gate assembly. In addition it is obvious that the invention is not limited to such gate assemblies as it can be readily used with other types of gates.

It is believed that the invention and many of its attendant advantages will be understood from the foregoing description and it will be apparent that various changes may be made in the form, construction and arrangement of the parts and that changes may be made in the form, construction and arrangement of the gate assembly described without departing from the spirit and scope of the invention or sacrificing all of its material advantages, the form hereinbefore described being merely a preferred embodiment thereof.

I claim:

1. A gate assembly for a milking parlour or like animal enclosure including a barrier adapted to be swing about a substantially horizontal elevated axis between an open position in which it allows exit of an animal from the enclosure, and a closed position in which it prevents such exit, and an additional barrier adapted to move in synchronism with said barrier in the opposite direction to that of said barrier, said additional barrier being an arm member coupled to said barrier to act as a false gatepost for the barrier in its closed position, said arm member further including a locating arm, movement of which is constrained by a guide on a support for said gate assembly.

2. The gate assembly of claim 1, wherein said additional barrier abuts said barrier in the closed position.

3. The gate assembly of claim 1, wherein said additional barrier is pivotally coupled to said barrier.

4. The gate assembly of claim 1, wherein said arm member has one end pivotally coupled to said barrier.

5. The gate assembly of claim 1, wherein said barrier further includes a lateral extension from one side which is lower when the barrier is open, said extension being positioned when the barrier is in an intermediate position to ride over the side flank of an exiting animal and when lowered prevents the exit of the following animal.

6. The gate assembly of claim 5, wherein the lateral extension is at chest height of the animal when said barrier is in said closed position.

7. The gate assembly of claim 1, wherein said barrier is triangular or quasi-triangular in shape and is pivotally mounted above, and adjcent, one side of the parlour or enclosure.

8. The gate assembly of claim 1, further including operating means for said barrier and a lever arrangement connecting said operating means to the barrier providing locking means tending to hold the barrier open against the action of gravvity, said locking means providing a past dead centre locking action, said lever arrangement including an extension arm on said barrier, an angled arm pivotally connected to the angled arm and to a rotatable shaft attached to a support, and said operating means connected to said rotatable shaft for rotating the shaft and said crank arm for opening and closing said barrier.

9. The gate assembly of claim 8, wherein said extension arm has a counterweight mounted thereon.

10. The gate assembly of claim 8, wherein said additional barrier is pivotally coupled to an extension on said extension arm.

11. The gate assembly of claim 10, wherein said arm member has its free ends bent angularly on opposite sides of its longitudinal axis.

* * * * *